April 22, 1924.
M. A. CARLSON
AUTOMOBILE DIRECTION INDICATOR
Filed June 14, 1922    2 Sheets-Sheet 1
Fig. 1.
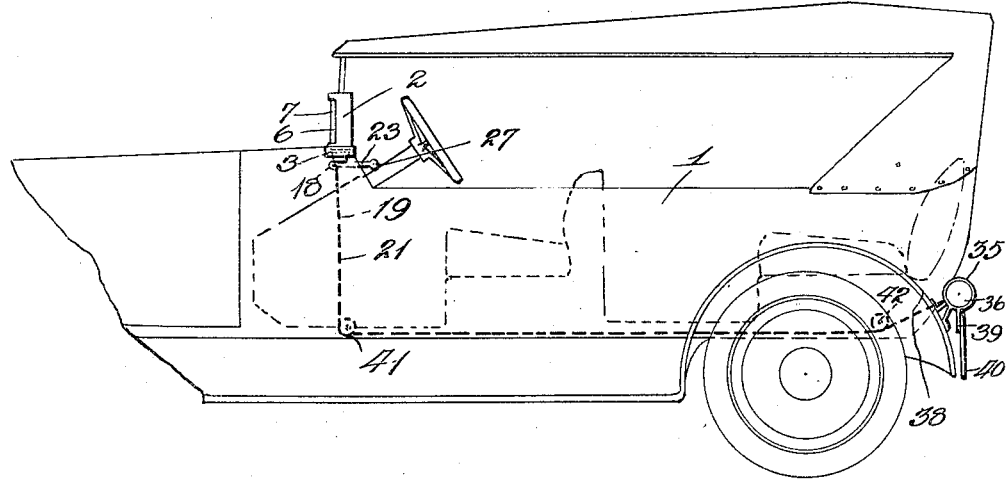
Fig. 6.
Fig. 2.
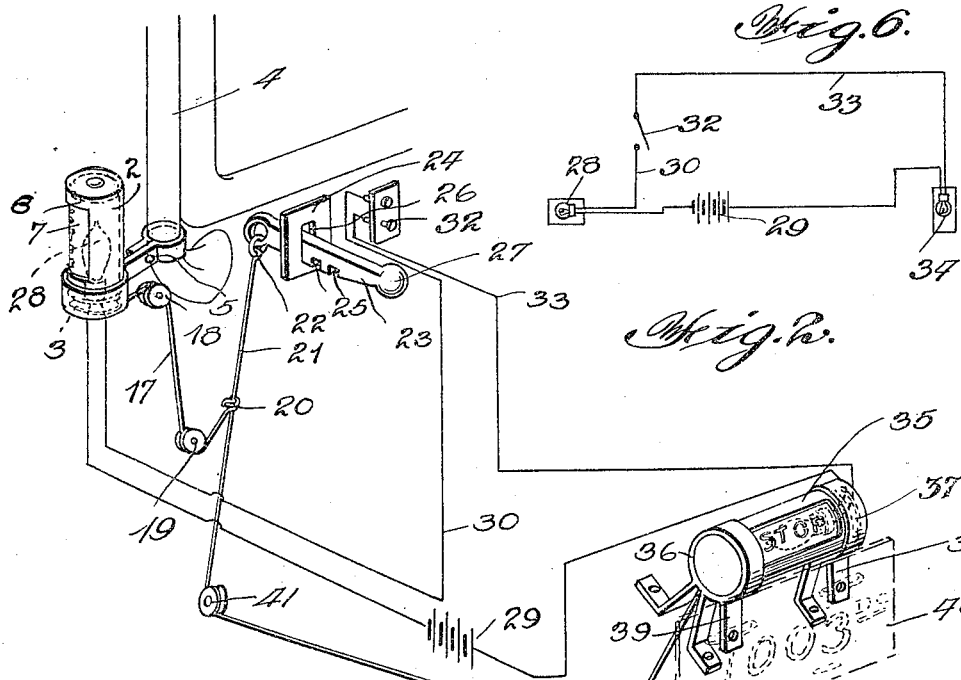
Inventor
M. A. Carlson
By Philip A. T. Swell
Attorney April 22, 1924.
M. A. CARLSON
1,491,582
AUTOMOBILE DIRECTION INDICATOR
Filed June 14, 1922
2 Sheets-Sheet 2
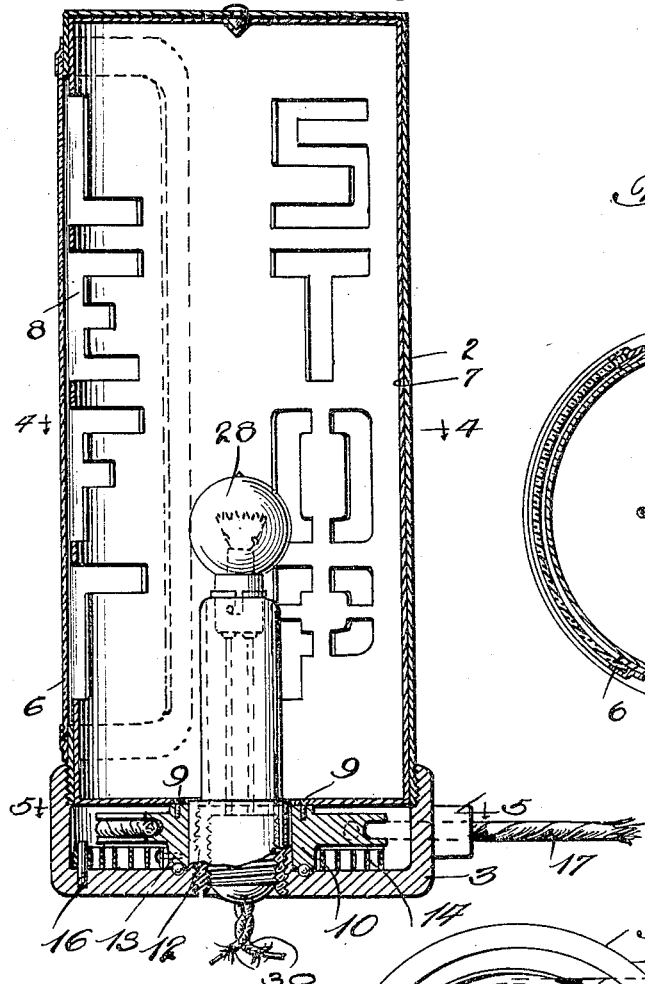
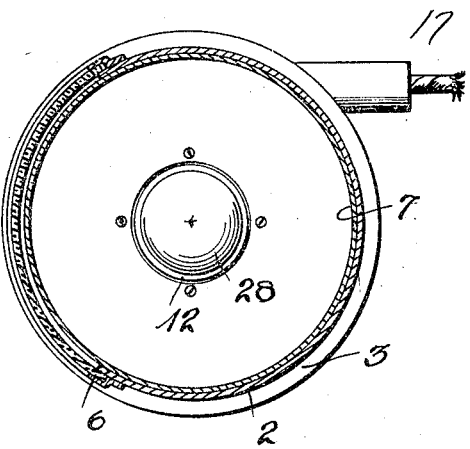
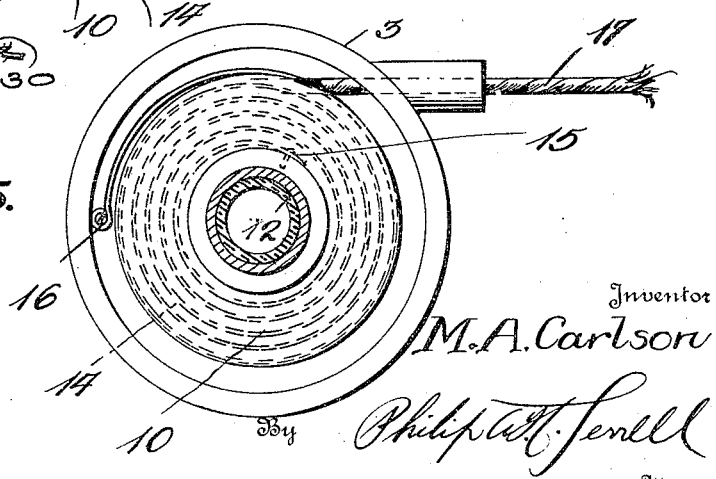
Inventor
M. A. Carlson
By Philip W. H. Ferrell
Attorney Patented Apr. 22, 1924.

1,491,582

UNITED STATES PATENT OFFICE.

MANUAL A. CARLSON, OF WAVERLY, NEBRASKA.

AUTOMOBILE DIRECTION INDICATOR.

Application filed June 14, 1922. Serial No. 568,100.

*To all whom it may concern:*

Be it known that MANUAL A. CARLSON, a citizen of the United States, residing at Waverly, in the county of Lancaster and State of Nebraska, has invented certain new and useful Improvements in Automobile Direction Indicators, of which the following is a specification, reference being had therein to the accompanying drawings.

The invention relates to automobile direction indicators and has for its object to provide a device of this character whereby approaching vehicles from ahead or from the rear may be signalled the contemplated turn of the vehicle by an operator or the intention to stop the vehicle. Also to provide signalling devices forwardly and rearwardly of the vehicle.

A further object is to provide light boxes at the forward and rear ends of the automobile, said light boxes having rotatable cylinders therein provided with cutout letters comprising the words "Stop, Right and Left," any one of which may be simultaneously moved into registration with an opening in the light box when it is desired to signal.

A further object is to provide spring means for normally maintaining the cylindrical signalling member in a position where the openings in the light boxes will be closed. Also to provide cable means for simultaneously controlling the cylindrical rotatable members against the action of their springs.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a side elevation of a conventional form of automobile showing the signalling device applied thereto.

Figure 2 is a perspective view of the signalling device.

Figure 3 is a vertical sectional view through the forward light box.

Figure 4 is a horizontal sectional view taken on line 4—4 of Figure 3.

Figure 5 is a horizontal sectional view taken on line 5—5 of Figure 3.

Figure 6 is a diagrammatic view of the electric circuit for the lights in the boxes.

Referring to the drawings, the numeral 1 designates a conventional form of automobile and 2 the forward light box which is cylindrically shaped and screwed into the base member 3, which base member is attached to the side of the wind shield 4 by means of a bracket 5 in such a manner as to support the light box 2 in a vertical position. The light box 2 is provided with an opening 6, with which opening the various words cutout from the revoluble cylindrical member 7 register during a signalling operation. For instance when the operator desires to signal an approaching vehicle of his intention to turn to the left, the word "left" indicated by numeral 8 is moved into registration with the opening 6. The lower end of the cylindrical member 7 is attached at 9 to a pulley 10, which pulley is supported on ball bearings 11 and is rotatably mounted on the upwardly extending cylindrical portion 12 of the member 3, therefore it will be seen that by rotating the pulley 10 that the cylindrical member 7 may be rotated as desired. Surrounding the boss 13 of the pulley 10 is a coiled spring 14, one end of which is anchored at 15 in the boss 13 and the other end at 16 to the member 3. The coiled spring forms means for maintaining the cylindrical member 7 in normal inoperative position, however when the signal is operated to move the words "Left, Stop, Right" or whatever legend desired in registration with the opening 6, a pull is imparted on the cable 17, which cable passes over the pulleys 18 and 19 and is connected at 20 to the main cable 21. The main cable 21 has its upper end connected at 22 to a notched rockable lever 23, which extends through a plate 24 and when any of its notches 25 of which are in engagement with the bottom of the aperture 26 of the plate 24 and is rocked downwardly at its handle end 27 pulls of different lengths are imparted on the cable 21, thereby imparting different amounts of rotation to the pulley 10 and consequently rotating the cylindrical member 7 on which the various legends are carried different distances for positioning any of said legends in registration with the light box opening 6. Disposed within the cylindrical member 7 and on the upper end of the cylindrical portion 12 thereof is an electric bulb 28, which bulb is in circuit with the battery 29 through the wires 30, switch 32, wires 33 to the rear bulb 34, which is carried in the rear light box 35. The rear light box is of substantially the same construction of the front light box but is horizontally disposed and is supported in brackets 36 and 37 carried by the rear mud guard 38, said brackets being provided with downwardly extending arms 39 to which may be attached a license plate 40. The numerals with the above exceptions are the same as those applied to the light box 2. The main cable 21 extends downwardly and rearwardly over a pulley 41, and thence upwardly over a pulley 42 to the light box 35. It will be seen that both cylindrical members 7 will be simultaneously rotated through the medium of the cables 21 and 17 and that both light signals will be simultaneously operated for signalling approaching vehicles forwardly and rearwardly.

From the above it will be seen that an automobile signalling device is provided which is simple in construction, positive in its operation and so constructed that approaching vehicles may be easily and quickly signalled as to approaching stop or turn of the operator.

The invention having been set forth what is claimed as new and useful is:—

A vehicle signalling light box comprising a horizontally disposed dished bracket, a casing threaded in said bracket and having an opening therein, a rotatable cylinder rotatably mounted within the casing and having legends thereon adapted to be moved into registration with the opening in the casing, an upwardly extending lamp receiving socket carried by the bracket and extending into the cylinder, said upwardly extending member having a lamp thereon, a horizontally disposed pulley rotatably mounted on the upwardly extending member, a rotatable cylinder secured to the upper side of the pulley, a coiled spring connected to the pulley and to the bracket and cable means for controlling the cylinder against the action of the coiled spring.

In testimony whereof I hereunto affix my signature.

MANUAL A. CARLSON.